Patented June 3, 1924.

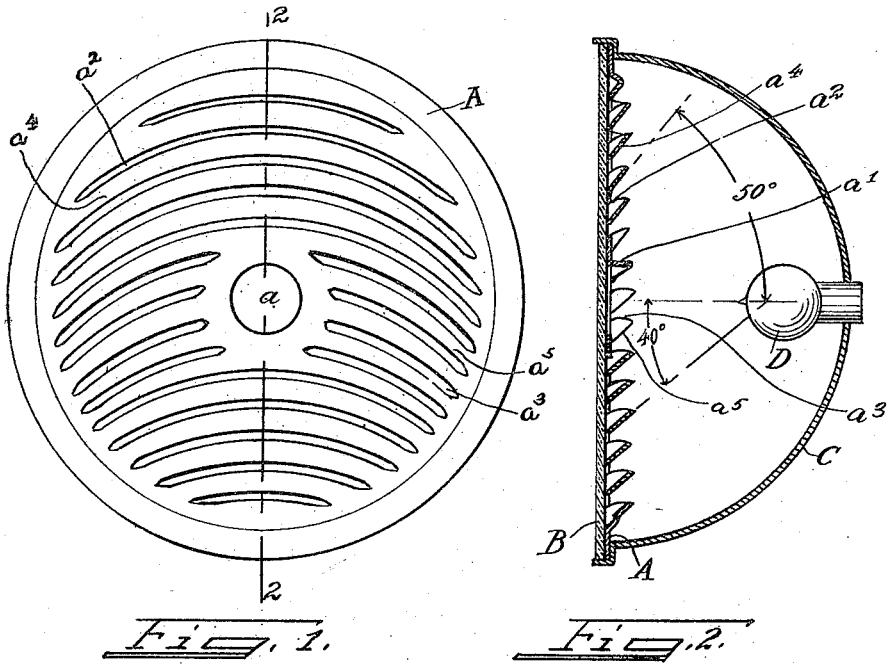
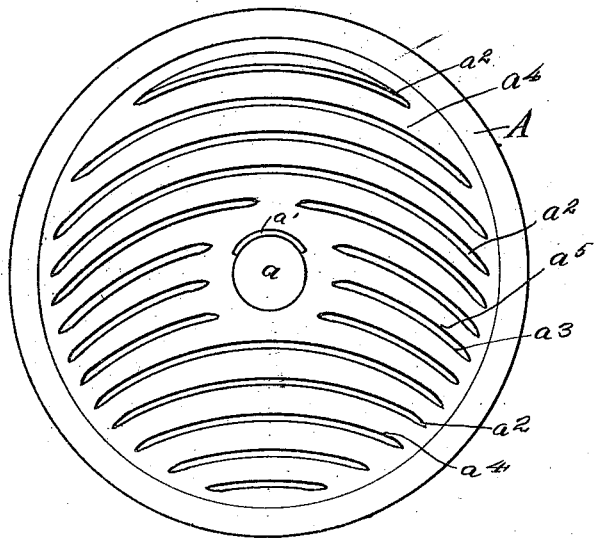

1,496,747

UNITED STATES PATENT OFFICE.

CHARLES SOLGER, OF CINCINNATI, OHIO, ASSIGNOR, BY MESNE ASSIGNMENTS, TO THE NATIONAL COLORTYPE COMPANY, OF CINCINNATI, OHIO, A CORPORATION OF OHIO.

ANTIGLARE DEVICE FOR HEADLAMPS.

Application filed September 30, 1921. Serial No. 504,479.

*To all whom it may concern:*

Be it known that I, CHARLES SOLGER, a citizen of the United States, residing at Cincinnati, in the county of Hamilton and State of Ohio, have invented new and useful Improvements in Antiglare Devices for Headlamps, of which the following is a specification.

My invention relates to head-lamps for vehicles and particularly to anti-glare devices for automobile head-lamps.

The object of the invention is to deflect all rays of light except those substantially parallel rays necessary for illumination of distant portions of the roadway, toward nearby portions of the roadway, and divert them downwardly and inwardly from the sides.

A further object is to avoid any obstruction of those substantially parallel rays that are necessary for illumination of the distant parts of the roadway, at the same time taking care not to allow the rays of light to strike high enough to throw a glare in the eyes of drivers of approaching vehicles, or of approaching pedestrians.

The device is simple, cheap, and easily applied to the inside of the lens of a head-lamp.

My invention is illustrated in the accompanying drawings in which:

Figure 1, is a front elevation of the device showing the convex sides of the deflectors up and the lower edges of the deflectors extending outwardly.

Fig. 2, is a cross-section on the line 2—2 of Fig. 1, and

Fig. 3, is a rear elevation of the device.

Referring now to the drawings, A is the sheet metal disc from which the device is made, B is the glass, whether plain or a lens forming the front of the headlamp, C is the reflector, and D the source of light. The disc has an opening $a$, preferably circular, of such size and so placed in relation to the source of light that the substantially parallel rays for lighting the roadway the maximum desired distance ahead, will pass through it; but none of these rays will fall high enough to blind drivers of approaching vehicles.

A deflector $a^1$, is placed at the edge of the upper part of the opening $a$ on the back side of the device, and deflects rays of light striking it onto the roadway at less distance than the direct rays.

Substantially all the remainder of the disc is cut with arctuate slots $a^2$, crossing the entire disc; or slots $a^3$, from near the circumference to near the central opening $a$.

The metal of the disc A is bent above each of these openings to form an arctuate deflector $a^4$, above the openings $a^2$; and $a^5$, above the openings $a^3$.

To better effectuate the anti-glare purpose of the invention, I prefer to make the angle of deflection of the lower deflectors, greater than that of the upper ones. I have found 40° inclination a suitable angle for the upper deflectors and 50° inclination suitable for the lower, the curvature of the deflectors may also be varied to further this object, but I do not limit myself to any particular form. It is obvious that the curvature of the openings $a^2$ and $a^3$ and the deflectors $a^4$ and $a^5$, the size and exact position of the openings $a$, with regard to the source of light D, and the angles of inclination of the several deflectors $a^4$, $a^5$, are dependent upon the extent to which the light is to be concentrated from side to side, and the scope of brilliant illumination and the distance bright light from direct rays is to be thrown upon the roadway.

I prefer to paint the outside of the device a dark color and to plate and burnish the inside; but I do not limit myself as to such details or the kind of material used.

I claim as my invention and desire to secure by Letters Patent of the United States:—

1. An anti-glare device for headlamps comprising a sheet metal disc adapted to be placed within the lamp, just back of the lens, an opening thru said disc of such size and so placed in relation to the source of light as to allow light rays therefrom to pass out upon and substantially parallel with the roadway straight ahead, and a series of upwardly convexed arcuate deflectors generally parallel to each other disposed above and below said opening.

2. An anti-glare device for headlamps comprising a sheet metal disc adapted to be placed within the lamp, just back of the lens, an opening thru said disc of such size and so placed in relation to the source of light as to allow light rays therefrom to pass out upon and substantially parallel with the roadway straight ahead, and a series of arcuate deflectors generally parallel to each other disposed above and below said opening, said deflectors having their convex side up and being of different curvature, the lower ones being of less curvature.

3. An anti-glare device for head-lamps having in combination a sheet metal disc adapted to be placed just back of the lens, an opening thru said disc of such size and so placed in relation to the source of light as to allow light rays therefrom to pass out upon and substantially parallel with the roadway straight ahead, an inwardly projecting deflector over the top of the said opening and substantially at right angles to the disc next said opening, and arcuate deflectors so formed by slitting and bending portions of said disc as to divert other than said direct rays in from the sides and down upon said roadway.

In testimony whereof I have hereunto set my hand in presence of two subscribing witnesses.

CHARLES SOLGER.

Witnesses:
CARL PHARES,
C. TAYLOR HANDMAN.